United States Patent [19]

Benson et al.

[11] Patent Number: 4,573,430
[45] Date of Patent: Mar. 4, 1986

[54] AUTOMATIC LEAD WIRE TINNING OF TAPE-PACKAGED COMPONENTS

[75] Inventors: Florence Benson, Big Lake; Mark J. Shireman, St. Louis Park, both of Minn.

[73] Assignee: Honeywell Inc., Minneapolis, Minn.

[21] Appl. No.: 669,165

[22] Filed: Nov. 7, 1984

[51] Int. Cl.⁴ ............................................. B05C 3/02
[52] U.S. Cl. ...................................... 118/411; 118/50; 118/74; 118/410; 118/423
[58] Field of Search ................... 118/74, 50, 410, 411, 118/423, 424; 228/37, 39

[56] References Cited

U.S. PATENT DOCUMENTS

| | | | |
|---|---|---|---|
| 3,363,819 | 1/1968 | Gerlitz | 118/423 X |
| 3,948,212 | 4/1976 | Mayer | 118/50 |
| 3,995,588 | 12/1976 | Booz et al. | 118/74 X |
| 4,402,448 | 9/1983 | O'Rourke | 228/37 X |
| 4,491,084 | 1/1985 | Marshall | 118/74 X |

FOREIGN PATENT DOCUMENTS 809883 4/1959 United Kingdom ................. 228/37

*Primary Examiner*—Shrive P. Beck
*Attorney, Agent, or Firm*—George W. Field

[57] ABSTRACT

In combination, a wave station establishing a wave of liquid solder having a convex configuration transverse to an axis which decreases in cross-sectional area with distance along the axis, apparatus transporting along the axis an electrical component having at least one linear conductor extending transverse to the axis to pass through the wave of solder, and heating and suction apparatus for removing excess solder from the conductor.

3 Claims, 8 Drawing Figures

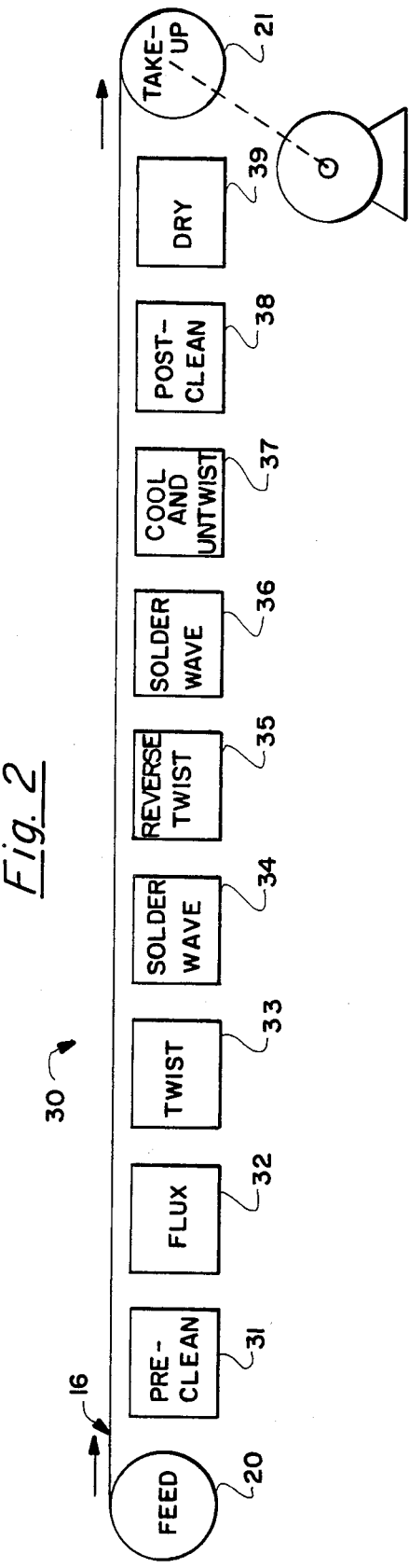
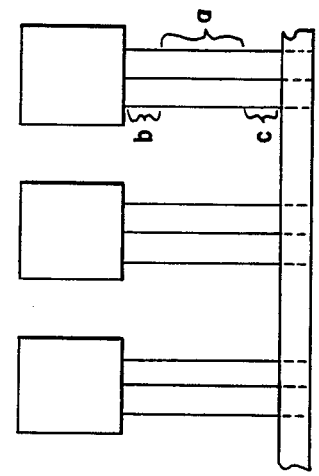
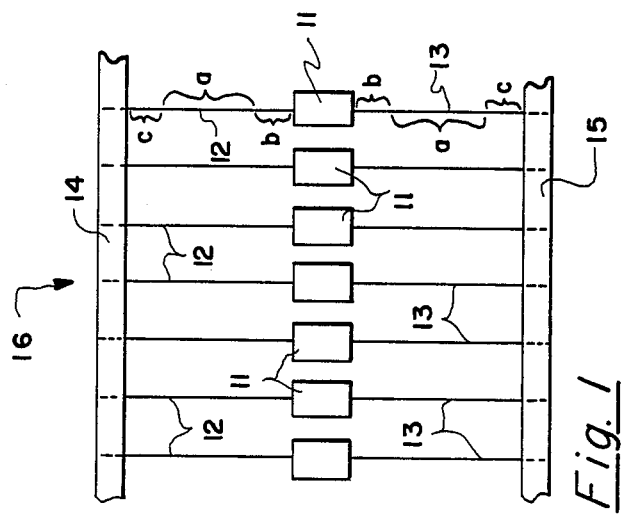

AUTOMATIC LEAD WIRE TINNING OF TAPE-PACKAGED COMPONENTS

FIELD OF THE INVENTION

This invention relates to the field of electrical manufacturing, and particularly to means for tinning the conductors of components supplied on taped rolls, in situ on the tapes.

BACKGROUND OF THE INVENTION

It is advantageous for commercial users of electrical components to be able to purchase much used components in large quantities, for later use as needed. To facilitate these large purchases, suppliers sometimes package components by mounting them between long tapes wound on spools or reels, which are easily stored by the purchasers, and from which the components are easily accessible.

In industrial applications, components are advantageously positioned physically on circuit boards with their conductors extending through holes in conductive patterns on the boards, to which patterns they are connected by wave soldering. This means that the solderability of the component conductors must be good at the time of use, regardless of how long a period of storage has occurred.

Various suppliers use various finishes on the component conductors, however: coatings of gold, silver, and tin are known, which may be of different thicknesses, porosities, and surface contamination. It has been found that a considerable amount of "touch up" action is often required after wave soldering, to perfect connections which were not made satisfactorily, and this is an expensive, manual process. The period of storage between purchase and use also has an unpredictable affect on the solderability of the component's conductors.

One way of overcoming this is to hand-tin all the conductors as the components are taken from the storage reels and before they are mounted on the circuit boards, but this is also a very costly and time consuming process.

BRIEF SUMMARY OF THE INVENTION

The present invention comprises apparatus for automatically tinning the leads of tape-stored electrical components, immediately upon receipt from the suppliers, without removing the components from the tapes. This has been found to overcome the tendency of the leads to become unsolderable with time, and can be done rapidly, automatically, and inexpensively irrespective of the surface treatment of the conductors as supplied. The arrangement is equally effective for components with "axial leads" extending to tapes in opposite directions from opposite ends of the components, and for components with "radial leads", extending to a single tape in a single direction from the component. Practice of the invention results in a supply of components of consistent solderability at any time of use no matter how they were originally supplied.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views, FIG. 1 shows a portion of a supply of components as packaged with axial leads, FIG. 2 is a block diagram of a lead wire tinning system according to the invention, FIG. 8 shows a portion of a supply of components as packaged with radial leads.

DETAILED DESCRIPTION OF THE PREFERRED EMBODIMENT

Figure 3:
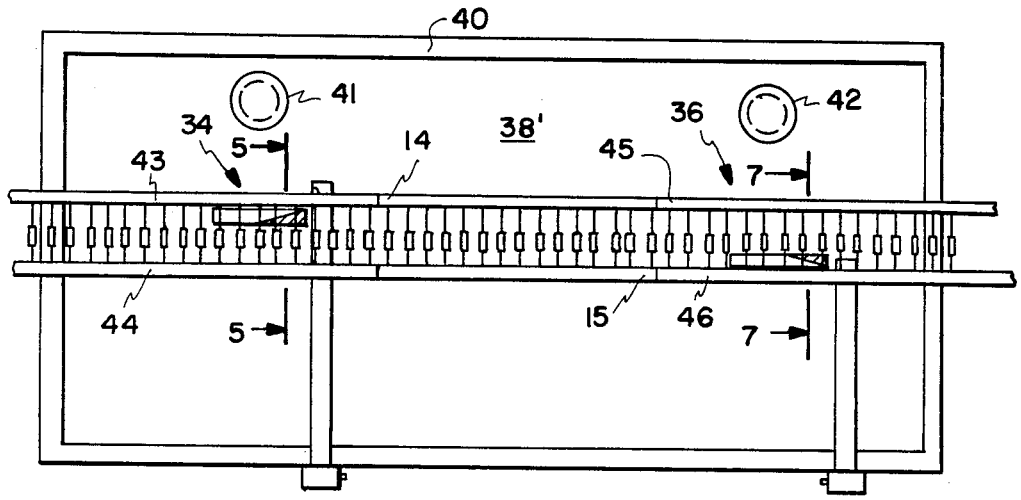
FIG. 3 is a plan view of a portion of the invention.
Figure 4:
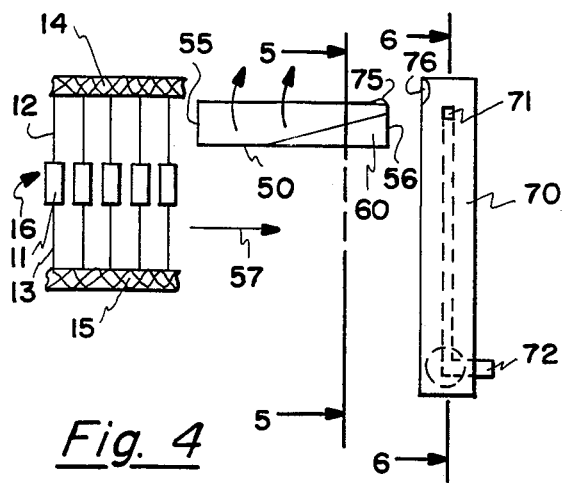
FIG. 4 is a fragmentary plan view of a portion of FIG. 3 to a larger scale.

Referring now to FIG. 1, there is shown a portion of a supply of electrical components as packaged for tape storage. Here a plurality of diodes 11 have axial leads 12 and 13 extending from opposite ends thereof in opposite directions. A first adhesive support tape 14 extends orthogonally to the free ends of leads 12 and a second support tape 15 extends orthogonally to the free ends of leads 13, so that the assembly comprises what may be called a "ribbon" 16 of components. It is desired to retin or solder-coat the portions "a" of each lead, as these are the portions which will later be used in assembling circuitry. Liquid solder should not be applied to portions "b" as the resulting heat may be detrimental to the components, and similarly portions "c" should not be contacted with solder to avoid heat degredation of tapes 14 and 15.

FIG. 2 shows that in the apparatus ribbon 16 is drawn from feed reel 20 to a driven take-up reel 21 along a path having a number of treatment stations. Except as will presently be pointed out, the conductors of the components remain generally horizontal while following this path. This may be conveniently arranged by providing properly spaced and oriented rails in which tapes 14 and 15 are guided, the tapes being extended beyond components at each end of the ribbon to lead the latter into and out of the equipment.

The path is identified by the general reference numeral 30, and includes in sequence a precleaning station 31, a fluxing station 32, a first twisting station 33, a first solder wave station 34, a reverse twisting station 35, a second solder wave station 36, a cooling and untwisting station 37, a post cleaning station 38, and a drying station 39.

Precleaning station 31 has nozzle means for applying cleaning solution to the conductors. Fluxing station 32 has foam head means for applying liquid flux to the conductors, particularly to portions "a" thereof. In twisting station 33 the tape is twisted to an angle of approximately 20 degrees so that leads 12 slope downwardly from components 11. This orientation is maintained through first solder wave station 34, which will be described below. In second twisting station 35 the twist is reversed so that leads 13 slope downwards from components 11. After passing solder wave station 36 the ribbon passes through cooling station 37 which, if desired, includes fan or blowing means, and in which the ribbon is restored to a normal horizontal orientation. Postcleaning station 38 has nozzle means directing a stream of water to flow against the soldered conductors, and the components and tapes are dried by suitable means in station 39 for discharge to take-up reel 21, after which they may be stored until the components are needed for use. Except for stations 34 and 36, the stations are generally known structures.

Turning now to FIG. 3, a satisfactory embodiment of stations 33 to 37 is shown to comprise a chamber or tray 40, with heat-insulating walls, in which a supply of solder 38' is maintained molten by suitable heating means not shown. Liquid solder is continuously pumped from chamber 40 by a first liquid metal pump 41 to first solder wave station 34, and similarly liquid solder is continuously supplied from tray 40 by a second liquid metal pump 42 to second solder wave station 36. Ribbon 16 is drawn from left to right past station 34 in tracks 43 and 44, which terminate just beyond station 34. Then the ribbon is drawn past station 36 in tracks 45 and 46, which begin just before station 36. Tracks 43 and 44 cause ribbon 16 to twist from a nominal horizontal orientation by about 20 degrees in a first direction, track 44 and tape 15 being higher than track 43 and tape 14. On the other hand, track 45 is higher than track 46, so that in these tracks tape 14 is higher than tape 15 and the ribbon is twisted to an orientation displaced from the horizontal by about 20 degrees in the opposite direction. The gap between tracks 43, 44 and tracks 45, 46 comprises reverse twisting station 35. Tape 14 travels first in track 43 and then in track 45, while tape 15 travels first in track 44 and then in track 46, so that a forty degree twist in ribbon 16 occurs. By this arrangement portions "a" of leads 12 are retinned at station 34, and then portions "a" of leads 13 are retinned at station 36, as will now be described.

Stations 34 and 36 are similar, and only one will be described in detail. Station 34 includes a vertical riser or chimney 50 in which upward flow of molten solder is maintained by a suitable pump: pumps of this sort are commercially available. At the top of a chimney one side 51 is lower than the other side 52, and has a rolled edge as indicated at 53 over which the solder 38' flows. The ribbon 16 of components moves across the top of chimney 50 from end 55 to end 56, as indicated by the arrow 57.

Figure 5:
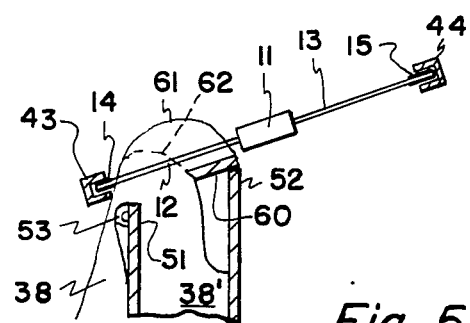
FIG. 5 is a fragmentary sectional view along the line 5—5 of FIG. 4 showing a component in place.
Figure 7:
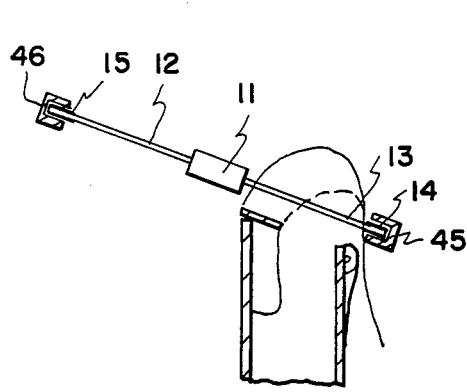
FIG. 7 is a view like FIG. 5 but taken along the line 7—7 of FIG. 3.
Figure 6:
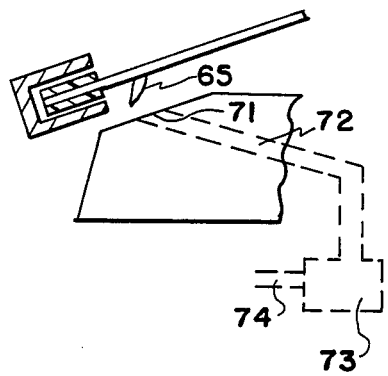
FIG. 6 is a fragmentary section view along the line 6—6 of FIG. 4 showing a component in place.

A wave shaper 60 is provided in chimney 50 to change the shape of the solder wave emerging from the chimney: the wave shape near end 55 is indicated at 61 in FIG. 5, and the wave shape near end 56 is indicated at 62. Tapes 14 and 15 move past chimney 50 in rails 43 and 44 so positioned that when each component first enters the solder wave most of its length, portion "a" is submerged, but as the ribbon proceeds the submerged length of conductor 12 decreases. By this arrangement any excess solder on conductor 12 runs toward the lower end to form what may loosely be termed an "icicle" 65, although it is in liquid rather than solid state.

If allowed to solidify, such icicles would seriously interfere with the subsequent incorporation of the components in the circuit boards, and so forth, so means is provided for removing the excess solder before it solidifies. Immediately adjacent to end 56 of chimney 50 there is provided a heated block 70 having a port 71 positioned for near passage by the components as they leave the chimney. A vacuum line 72 connects port 71 with a collection jar 73 which is maintained at subatmospheric pressure by a suitable pump connection 74. As each conductor 12 passes port 71, any "icicle" of excess liquid solder is pneumatically removed to jar 73.

For most satisfactory flow of liquid solder, it has been found helpful to modify edge 51 by providing a slight curve 75, and to provide block 70 with a recess 76, to enable slight flow of liquid metal in the direction of movement of the ribbon.

Station 36 is like station 34 except that the top of the chimney is bevelled in the opposite direction, and the rails lead conductors 13 through the solder instead of conductors 12. It will be apparent that if components are being treated which have radial rather than axial leads, only one tape and one solder wave station are necessary.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. In combination:
   a wave station establishing a wave of liquid solder having a convex configuration, transverse to an axis, which decreases in cross-sectional area with distance in a first direction along said axis;
   and means transporting along said axis in said direction an electrical component having at least one linear conductor extending transverse to said axis to pass through said wave.

2. Apparatus for tinning predetermined portions of conductors extending transversely in opposite directions from a succession of electrical components carried on tape means orthogonally interconnecting the opposite ends of said conductors, comprising means moving said tape means and said components generally horizontally along a path including, in succession:
   a feed reel;
   a precleaning station having nozzle means applying cleaning solution to said conductors;
   a fluxing station having foam head means for applying liquid flux to said portions of said conductor;
   means orienting said tape means so that first conductors slope downwardly from first ends of said components;
   a fist solder wave station establishing a wave of liquid solder having a convex configuration transverse to said path so that said chosen portions of said first conductors pass through and emerge from said wave, said wave station including means for removing excess solder from the lower ends of said first conductor;
   means reorienting said tape means so that second conductors slope downward from second ends of said components;
   a second solder wave station establishing a wave of liquid solder having a convex configuration transverse to said path so that said chosen portions of said second conductors pass through and emerge from said wave, said second solder wave station including means for removing excess solder from the lower ends of said second conductors;

a cooling station;

a post cleaning station having nozzle means applying rinsing liquid to said portions of said conductors;

a drying station; and a take up reel.

3. Apparatus for tinning predetermined portions of conductors extending transversely from a succession of electrical components carried on tape means orthogonally interconnecting the ends of said conductors, comprising means moving said tape means and said components generally horizontally along a path including, in succession:

a feed reel;

a precleaning station having nozzle means applying cleaning solution to said predetermined portions of said conductor;

a fluxing station having foam head means for applying liquid flux to said portions of said conductors;

means orienting said tape means so that first conductors slope downwardly from first ends of said conductors;

a solder wave station establishing a wave of liquid solder having a convex configuration transverse to said path so that said chosen portions of said conductors pass through and emerge from said wave said wave station including means for removing excess solder from the lower ends of said conductors;

a cooling station;

a post cleaning station having nozzle means applying rinsing liquid to said portions of said conductors;

a drying station; and a take up reel.

* * * * *